US009946978B2

(12) United States Patent
Francis

(10) Patent No.: US 9,946,978 B2
(45) Date of Patent: Apr. 17, 2018

(54) SYSTEM AND METHOD FOR ITINERARY PLANNING

(75) Inventor: Matthew David Francis, Wiltshire (GB)

(73) Assignee: TRAPEZE SOFTWARE ULC, Mississauga (CA)

( * ) Notice: Subject to any disclaimer, the term of this patent is extended or adjusted under 35 U.S.C. 154(b) by 96 days.

(21) Appl. No.: 13/432,812

(22) Filed: Mar. 28, 2012

(65) Prior Publication Data

US 2012/0253657 A1  Oct. 4, 2012

Related U.S. Application Data

(60) Provisional application No. 61/468,393, filed on Mar. 28, 2011, provisional application No. 61/468,400, filed on Mar. 28, 2011, provisional application No. 61/490,100, filed on May 26, 2011, provisional application No. 61/490,105, filed on May 26, 2011.

(51) Int. Cl.

| G06Q 10/02 | (2012.01) |
| G01C 21/34 | (2006.01) |
| G01C 21/32 | (2006.01) |
| G06Q 10/04 | (2012.01) |

(52) U.S. Cl.
CPC ........... *G06Q 10/025* (2013.01); *G01C 21/32* (2013.01); *G01C 21/3423* (2013.01); *G01C 21/3446* (2013.01); *G06Q 10/047* (2013.01)

(58) Field of Classification Search
CPC ..... G01C 21/00; G01C 21/34; G01C 21/3423
USPC ........................................................ 701/410
See application file for complete search history.

(56) References Cited

U.S. PATENT DOCUMENTS

| 5,604,676 A |   | 2/1997  | Penzias |
| 5,978,733 A | * | 11/1999 | Deshimaru et al. ......... 701/430 |
| 5,991,688 A | * | 11/1999 | Fukushima et al. ........ 701/411 |
| 6,421,606 B1 |  | 7/2002  | Asai et al. |

(Continued)

FOREIGN PATENT DOCUMENTS

| CA | 2407487 A1 | 10/2001 |
| DE | 10 2008 062119 A1 | 6/2010 |

(Continued)

OTHER PUBLICATIONS

Hannah Bast et al: "Fast Routing in Very Large Public Transportation Networks Using Transfer Patterns", Sep. 6, 2010 (Sep. 6, 2010), Algorithms A ESA 2010, Springer Berlin Heidelberg, Berlin, Heidelberg, pp. 290-301, XP019152268, ISBN: 978-3-642-15774-5.

(Continued)

*Primary Examiner* — McDieunel Marc
(74) *Attorney, Agent, or Firm* — Elan IP Inc.

(57) ABSTRACT

A method for itinerary planning includes the steps of populating a first queue with a first set of network segments connected to an origin, removing one of the network segments from the first queue, placing an expansion build representing the one network segment together with a continuing network segment in a second queue if the continuing network segment has not been considered, noting a cost for the expansion build if it arrives at a destination, and placing a captured build representing the one network segment together with the continuing network segment in the first queue if the continuing network segment has been considered.

19 Claims, 11 Drawing Sheets

(56) References Cited

U.S. PATENT DOCUMENTS

| | | | |
|---|---|---|---|
| 6,658,093 B1* | 12/2003 | Langseth et al. | 379/88.17 |
| 7,472,080 B2* | 12/2008 | Goel | 705/5 |
| 7,840,427 B2 | 11/2010 | O'Sullivan | |
| 8,442,848 B2 | 5/2013 | Myr | |
| 8,469,153 B2 | 6/2013 | Wu | |
| 2001/0025222 A1 | 9/2001 | Bechtolsheim et al. | |
| 2001/0049581 A1 | 12/2001 | Kane et al. | |
| 2008/0027772 A1* | 1/2008 | Gernega et al. | 705/7 |
| 2008/0162033 A1 | 7/2008 | Wagner | |
| 2009/0070035 A1 | 3/2009 | Van Buer | |
| 2009/0088962 A1* | 4/2009 | Jones | G06F 17/3087 701/519 |
| 2009/0119001 A1* | 5/2009 | Moussaeiff et al. | 701/200 |
| 2009/0125229 A1* | 5/2009 | Peri et al. | 701/201 |
| 2009/0225658 A1* | 9/2009 | Rezvani | H04L 45/00 370/241 |
| 2009/0234681 A1* | 9/2009 | Champernowne | 705/5 |
| 2009/0234682 A1 | 9/2009 | Baggett et al. | |
| 2010/0268447 A1* | 10/2010 | Griffiths | G01C 21/3423 701/532 |
| 2010/0268450 A1 | 10/2010 | Evanitsky | |
| 2010/0305984 A1 | 12/2010 | Ben-Yitschak et al. | |
| 2011/0112759 A1 | 5/2011 | Bast et al. | |
| 2011/0184774 A1 | 7/2011 | Forstall et al. | |
| 2012/0059740 A1 | 3/2012 | de Marcken et al. | |
| 2012/0143882 A1* | 6/2012 | Zheng et al. | 707/751 |
| 2012/0253878 A1 | 10/2012 | Forstall | |
| 2013/0158846 A1 | 6/2013 | Zhang | |

FOREIGN PATENT DOCUMENTS

| | | |
|---|---|---|
| EP | 1772706 A1 | 3/2011 |
| WO | WO 2009/065637 A1 | 5/2009 |
| WO | WO 2009/655637 A1 | 5/2009 |

OTHER PUBLICATIONS

Hickman "Robust passenger itinerary planning using transit AVL data", The IEEE 5th International Conference on Intelligent Transportation Systems, Sep. 3-6, 2002, Singapore, pp. 840-845.

Tan et al. "Study and implementation of a decision supply system for urban mass transit service planning", Journal of Information Technology Management, vol. XV. No. 1-2. pp. 14 to 32,2004. ISSN#1042-1319.

Zografos el al. "Algorithms for itinerary planning in multimodal transportation networks", IEEE Transactions on Intelligent Transportation Systems, vol. 9, No. 1, Mar. 2008. p. 175-184, , XP011205057, ISSN: 1524-9050.

* cited by examiner

280

**Trip Planner
Itinerary**

1. Travel from O to A : 11 minutes
2. Travel from A to B : 20 minutes
3. Travel from B to C : 14 minutes
4. Travel from C to T : 20 minutes Total travel time : 65 minutes

SYSTEM AND METHOD FOR ITINERARY PLANNING

This application claims priority from U.S. Provisional Patent Application Ser. No. 61/468,393, filed on Mar. 28, 2011, U.S. Provisional Patent Application Ser. No. 61/468, 400 filed on Mar. 28, 2011, U.S. Provisional Patent Application Ser. No. 61/490,100, filed on May 26, 2011, and U.S. Provisional Patent Application Ser. No. 61/490,105, filed on May 26, 2011, the contents of all of which are incorporated herein in their entirety by reference.

FIELD OF THE INVENTION

The present invention relates to the field of transportation. In particular, it relates to a system and method for itinerary planning.

BACKGROUND OF THE INVENTION

Itinerary planning is generally known. Given a travel network, and a set of parameters that form an itinerary planning request, an itinerary is generated that best satisfies the parameters. The travel network typically is a street network or a public transportation network, but, in some cases, can incorporate two or more travel means to enable a comprehensive solution to be provided. The travel network consists of a set of paths, or network segments, that are terminated at both ends by nodes. For example, both metropolitan trains and transit buses travel along fixed routes that have scheduled stops therealong. Nodes can be used to represent the stops and network segments model the travel of the trains and buses between the stops. Nodes are often defined to denote points where interchange between various travel means can occur.

To further complicate things, when dealing with scheduled services such as bus and train services, network nodes may be used to not only represent physical locations, but also can be used to represent locations at particular times. This information can be important in determining estimated travel times, whether interchanges at nodes are possible and, if so, how long may have to be waited, etc. It can be undesirable to plan arrival at an intersection of a first bus route being traveled, for example, to change to a second bus route when the last bus for the day will have already departed from that location.

Itinerary planning requests typically include a departure location (referred to as an "origin"), a destination, and a desired departure time. The itinerary planning requests may also include a desired arrival time, possibly instead of the desired departure time. Using the parameters provided in the itinerary planning request, the travel network can be analyzed to identify itineraries that may be suitable and select the best one from them. Where the travel network is large, however, the process of identifying suitable itineraries can be onerous.

Many systems for itinerary planning use an approach known as Dijkstra's Algorithm to solve this problem. Dijkstra's Algorithm is a graph search algorithm that solves the single-source shortest route problem for a graph with non-negative network segment costs, producing a shortest route tree. Using this approach, the route with the lowest cost between the origin node and every other node is identified. It can also be used for finding the costs of the shortest (i.e., least costly) routes from the origin node to a destination node by stopping the algorithm once the shortest route to the destination node has been determined. This can be done since Dijkstra's Algorithm relies on maintaining partial solutions ordered by cost. This ordering of partial solutions can, however, be processor-intensive.

While Dijkstra's Algorithm and other such approaches provide a reasonably efficient solution in some scenarios, it can be cumbersome for other scenarios, such as travel networks that have relatively-uniform topologies; that is, where the lowest cost solution between any two nodes usually involves traversing the fewest network segments.

It is therefore an object of this invention to provide a system and method for itinerary planning.

SUMMARY OF THE INVENTION

In accordance with an aspect of the invention, there is provided a method for itinerary planning, comprising:

populating a first queue with a first set of travel network segments connected to the origin;

removing one of said network segments from said first queue;

placing an expansion build representing said one network segment together with a continuing network segment in a second queue if said continuing network segment has not been considered;

placing a captured build representing said one network segment together with said continuing network segment in said first queue if said continuing network segment has been considered;

repeating said removing and said placing until said first queue is empty;

replacing said first queue with said builds in said second queue;

repeating said removing to said replacing until said first and second queues are empty; and outputting at least one of said builds having a lowest cost.

The placing of the expansion build can include:

placing said expansion build in said second queue if a best possible outcome for said expansion build is less than or equal to a threshold value; and placing said expansion build in a third queue if said best possible outcome for said expansion build is greater than said threshold value, and wherein said repeating said removing comprises:

repeating said removing to said replacing steps until said first, second and third queues are empty.

The method can further include:

replacing said first queue with said third queue when said first and second queues are empty.

The replacing of the first queue can further include adjusting the threshold.

The placing of the expansion build can include:

placing said expansion build representing said one network segment together with a continuing network segment in a second queue if said continuing network segment has not been considered and if the cost to arrive at the end of said expansion build is better than the cost previously determined for arriving at the end of said continuing network segment.

The placing of the captured build can include:

placing a captured build representing said one network segment together with said continuing network segment in said first queue if said continuing network segment has been considered and if the cost to arrive at the end of said captured build is better than the cost previously determined for arriving at the end of said continuing network segment.

The method can further include:

noting the cost of said build if said continuing network segment arrives at the destination.

In accordance with another aspect of the invention, there is provided a system for itinerary planning, comprising:

a database of travel network segments;

a processor executing computer-executable instructions for analyzing said network segments and, in response to an itinerary planning request, populating a first queue with a first set of network segments connected to the origin, removing one of said network segments from said first queue, placing an expansion build representing said one network segment together with a continuing network segment in a second queue if said continuing network segment has not been considered, placing a captured build representing said one network segment together with said continuing network segment in said first queue if said continuing network segment has been considered, repeating said removing and said placing until said first queue is empty, replacing said first queue with the builds in said second queue, and repeating said removing to said replacing until said first and second queues are empty, and outputting at least one of said builds having a lowest cost.

The processor can place the expansion build in the second queue if a best possible outcome for the expansion build is less than or equal to a threshold value, place the expansion build in a third queue if the best possible outcome for the expansion build is greater than the threshold value, and repeat the removing to the replacing steps until the first, second and third queues are empty.

The processor can replace the first queue with the third queue when the first and second queues are empty.

The processor can adjust the threshold when replacing the first queue with the second queue.

The processor can place the expansion build representing the one network segment together with a continuing network segment in a second queue if the continuing network segment has not been considered and if the cost to arrive at the end of the expansion build is better than the cost previously determined for arriving at the end of the continuing network segment.

The processor can place a captured build representing the one network segment together with the continuing network segment in the first queue if the continuing network segment has been considered and if the cost to arrive at the end of the captured build is better than the cost previously determined for arriving at the end of the continuing network segment.

The processor can note the cost of the build if the continuing network segment arrives at the destination.

In accordance with a further aspect of the invention, there is provided a method for itinerary planning, comprising:

generating builds of network segments for a journey, said network segments being stored in a database in storage of a computer system;

placing said builds that whose last network segment has been previously considered in a first queue;

placing said builds whose last network has been previously unconsidered in a second queue;

expanding said builds in said first queue before expanding said builds in said second queue; and outputting at least one of said builds arriving at a destination for said journey having a lowest cost.

The placing of the builds in the second queue can include:

placing said builds in said second queue if a best possible outcome for said builds is less than or equal to a threshold value; and placing said builds in a third queue if said best possible outcome for said builds is greater than said threshold value.

The method can include replacing the first queue with the second queue when the first queue is empty.

The method can include replacing the first queue with the third queue when the first and second queues are empty.

The replacing of the first queue can include adjusting the threshold.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE EMBODIMENTS

The invention relates to a system and method of itinerary planning. Given an itinerary planning request that includes an origin, a destination, a desired time of departure or arrival and various other constraints, one or more suitable travel itineraries is generated, if possible. Each solution is known as an itinerary. An itinerary can include some combination of public transportation, walking and road travel by private vehicle or taxi. Nodes are physical locations, such as intersections, bus stops and train stations. Network segments represent means for traveling between the nodes. A network segment is usually one of the following: a set of trips between consecutive stopping points, a walk transfer between vehicles, and the traversal of a street segment, either on foot or by private vehicle (for example, car or taxi).

It has been found that, by processing series (or "builds") of connected network segments ending with previously-considered network segments are processed prior to those builds that end with previously-unconsidered network segments, processing time can be reduced in some circumstances. This is because alternative routes terminating with the same network node are explored first to potentially rule out some alternatives before exploration of a continuing network segment occurs. A continuing network segment refers to one that can be performed after the completion of an earlier network segment. In this manner, the continuing network segment can be analyzed in relation to fewer alternative routes. This is particularly likely where the travel network is generally linear, such as is the case for street and public transit networks.

Builds can also represent single network segments.

Figure 1:
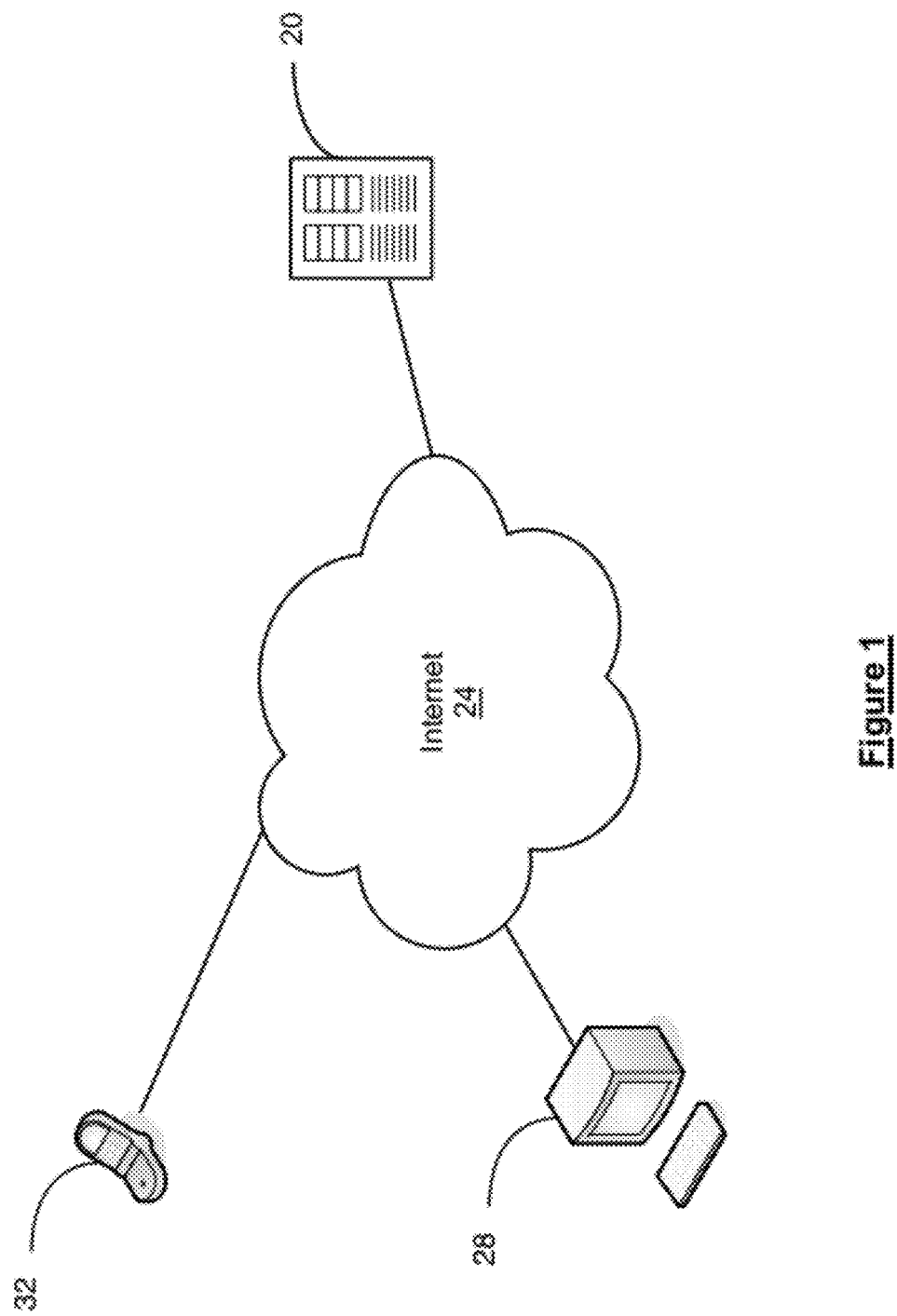
FIG. 1 is a schematic diagram of a computer system for itinerary planning in accordance with an embodiment of the invention, and its operating environment.

FIG. 1 shows a computer system 20 for itinerary planning in accordance with an embodiment of the invention, and its operating environment. The computer system 20 stores travel network data about various travel networks for traveling. The travel network data can include public transportation route and schedule information, road networks, gradients for street network segments, traffic volume information, etc. Public transportation routes can include, for example, bus, train (underground and over land) and boat routes. Using the travel network data, the computer system 20 can receive an itinerary planning request generated via a served request page, analyze the travel network data, generate one or more itineraries, and generate and serve one or more web pages that show the itineraries generated for the itinerary planning request.

The computer system 20 is coupled to a large communications network 24, such as the Internet. The computer system 20 operates a web service for serving web pages in response to requests for the same. A personal computer 28 is also shown in communication with the communications network 24 and executes an operating system and a web browser for enabling a user to access content available through web servers. A mobile device 32 is additionally in communication with the communications network 24 via a number of intermediate cellular communications towers, servers and switches that are not shown. Like the personal computer 28, the mobile device 32 executes an operating system and a web browser for enabling a user to access functionality and data available through web servers.

Figure 2:
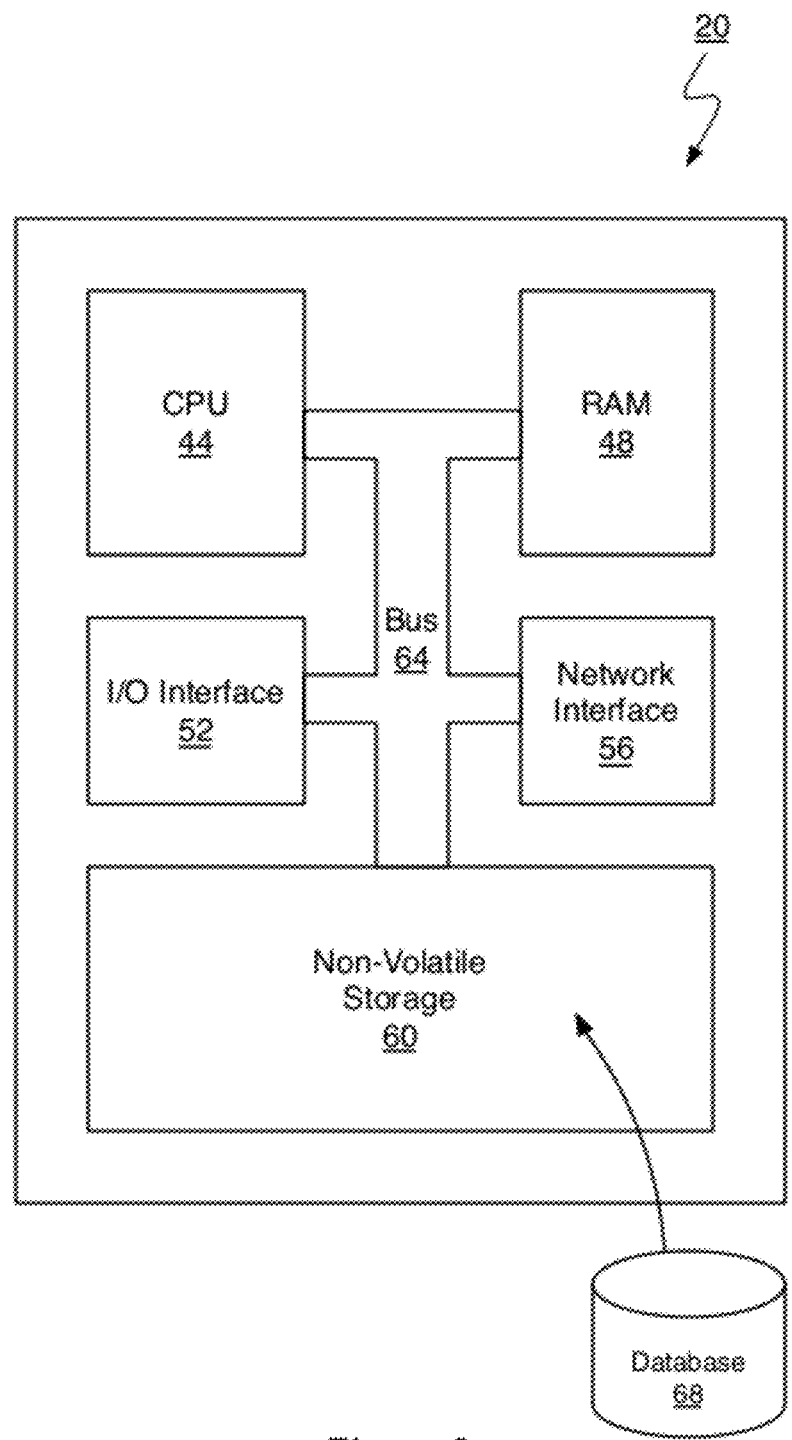
FIG. 2 is a block diagram of the computer system shown in FIG. 1.

FIG. 2 shows a number of components of the computer system 20 for itinerary planning of FIG. 1. As shown, the computer system 20 has a number of components, including a central processing unit ("CPU") 44 (also referred to simply as a "processor"), random access memory ("RAM") 48, an input/output interface 52, a network interface 56, non-volatile storage 60, and a local bus 64 enabling the CPU 44 to communicate with the other components. The CPU 44 executes an operating system and programs that provide the desired functionality. RAM 48 provides relatively-responsive volatile storage to the CPU 44. The input/output interface 52 allows for input to be received from one or more devices, such as a keyboard, a mouse, etc., and enables the CPU 44 to present output to a user via a monitor, a speaker, etc. The network interface 56 permits communication with other systems for receiving itinerary planning requests and for providing itinerary responses, in the form of web pages. Non-volatile storage 60 stores the operating system and programs, including computer-executable instructions for itinerary planning. During operation of the computer system 20, the operating system, the programs and the data may be retrieved from the non-volatile storage 60 and placed in RAM 48 to facilitate execution.

A travel network database 68 is maintained by the computer system 20 in non-volatile storage 60. The travel network database 68 stores public transportation route and schedule information, road networks, etc.

The computer system 20 executes computer-executable instructions in the form of itinerary planning software stored in the non-volatile storage 60. The itinerary planning software generates itineraries for itinerary planning requests that include some request parameters, such as, for example, the origin of the journey, the journey destination, the preferred time of departure and/or the preferred time of arrival, etc.

The itineraries include one or more journey segments. The journey segments correspond to rides on transit vehicles such as buses and trains, walked passages, taxi rides, etc.

Using knowledge of the schedules and routes of the various travel means stored in the travel network database 68, the itinerary planning software is able to generate one or more itineraries for travel from the origin to the destination. The generated itineraries can be generally optimized on one or more of time, cost, the amount of walking, the number of vehicle transfers, the timeliness of the arrival, the timeliness of the departure, the number of travel means changes (such as interchanges between buses), etc.

In addition to the itinerary planning software, the computer system 20 executes a web service for serving web pages in response to requests received from clients such as the personal computer 28 and the mobile device 32.

The travel network database 68 stores information about various public transportation networks and street networks. The various networks include a set of nodes connected via network segments. As there are often two or more means for traveling from one node to another, nodes can be connected by more than one network segment.

Each network segment is classified as one of the following:
  Discrete trips are trips that depart from each stop at specific times.
  Frequent trips are trips that run at a regular interval within a time window, rather than at discrete times. Identifying trips that run at a specific frequency greatly reduces the memory overhead for a large dataset. It is then only necessary to store the departure and arrival times for the first and last trips in the sequence.
  Continuous trips are trips that depart immediately as required, i.e. it does not run to a schedule. Travel through the street network, either on foot or by private vehicle, is typically continuous.

The itinerary planning software treats a continuous trip is just a special case of a frequent trip. The interval is very small, i.e. a second, and the time window is typically 24 hours.

Public Transportation Network Data

In order to understand the type of data that is stored in the travel network database 68 for public transportation networks, as well as its use, it will now be described.

Figure 3:
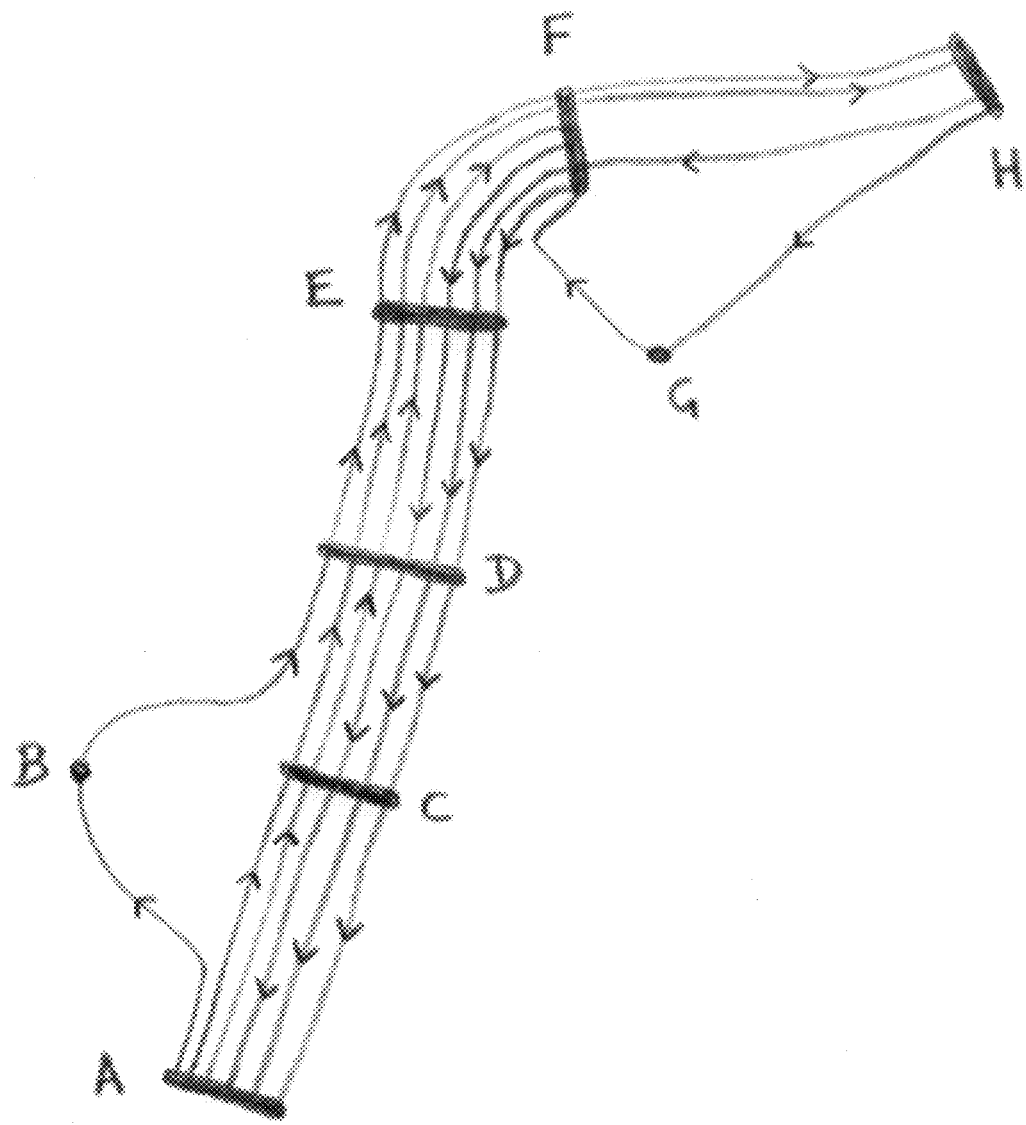
FIG. 3 shows an exemplary set of trips for a bus route that are considered during itinerary planning by the computer system of FIG. 1.

FIG. 3 shows an exemplary set of trips in both directions for a bus route between two nearby towns, A and F. The sequence of stops visited is the same for all trips in the day, except in the morning and evening when the bus either detours or terminates short of its normal destination. All trips for the bus are described as belonging to the same route. All bus trips from A to F are described as outbound trips. Likewise, bus trips from F to A are described as inbound trips.

Below is shown the schedule for outbound bus trips:

|        | Trip 1 | Trip 2 |       | Trip 10 | Trip 11 | Trip 12 |
|--------|--------|--------|-------|---------|---------|---------|
| Stop A | 0820   | 0930   |       | 1730    | 1825    | 1915    |
| Stop B | 0830   |        |       |         |         |         |
| Stop C |        | 0935   | then  | 1735    | 1830    | 1920    |
| Stop D | 0840   | 0940   | every | 1740    | 1835    | 1925    |
| Stop E | 0845   | 0945   | hour  | 1745    | 1840    | 1930    |
| Stop F | 0850   | 0950   | until | 1750    | 1845    | 1935    |
| Stop H | 0855   | 0955   |       | 1755    |         |         |

Further, the schedule for inbound bus trips follows:

|        | Trip 1 | Trip 2 |       | Trip 10 | Trip 11 | Trip 12 |
|--------|--------|--------|-------|---------|---------|---------|
| Stop H | 0820   | 0900   |       | 1700    |         |         |
| Stop G |        | 0825   |       |         |         |         |
| Stop F | 0830   | 0905   | then  | 1705    | 1800    | 1850    |
| Stop E | 0835   | 0910   | every | 1710    | 1805    | 1855    |
| Stop D | 0840   | 0915   | hour  | 1715    | 1810    | 1900    |
| Stop C | 0845   | 0920   | until | 1720    | 1815    | 1905    |
| Stop A | 0850   | 0925   |       | 1725    | 1820    | 1910    |

All bus trips that visit exactly the same sequence of stops are said to belong to the same "pattern". In this example, there are three patterns in each direction (normal—trips 2 to 10, detour—trip 1, and short running—trips 11 and 12). Vehicles that run to the same pattern do not overtake one another. A pattern also has a unique sequence of stop activities, i.e. whether passengers may alight, board, or transfer to other vehicles.

The itinerary planning software groups all public transportation trips into patterns. That is, the itinerary planning software does not treat trips of the same type separately, even though they may depart at different times. When identifying continuing network segments, the itinerary planning software considers each of the patterns departing from the stop. The consideration of each of the trips departing from the stop is unnecessarily time-consuming and, thus, generally avoided. The itinerary planning software identifies the next departure for a pattern and then ignores all other departures for that pattern.

The link between each consecutive pair of stops in a pattern is called a pattern segment. This is a derivation and specific case of a network segment. Each pattern segment has a time index for the departures at the start of the segment, and another time index for the arrivals at the end of the segment. The time index is a hashing mechanism that efficiently answers one of the following questions:

What is the first trip in the pattern segment to depart at or after a specific time?

| Time at C | Ordinal of next departure |
|-----------|---------------------------|
| 0000      | 0                         |
| ...       | ...                       |
| 0800      | 0                         |
| 1000      | 1                         |
| 1200      | 3                         |
| ...       | ...                       |
| 2200      | NULL                      |

What is the first trip in the pattern segment to arrive at or before a specific time?

| Trip ordinal | Time departing C for A |
|--------------|------------------------|
| 0            | 0920                   |
| 1            | 1020                   |
| 2            | 1120                   |
| 3            | 1220                   |
| 4            | 1320                   |
| ...          | ...                    |
| 8            | 1720                   |

The time index in this example has an interval of two hours. The actual interval for most public transportation network patterns is expected to be a lot shorter than this. Many network segments often share an identical time index; i.e., the sequence of ordinals associated with departures (or arrivals) may not be unique. These duplicates are identified during data processing to reduce the memory overhead. However, this relies on trips being grouped into non-overlapping day sets. The time index lookup process for finding the next departure time for a pattern from a stop is then as follows:

(a) Round down the required departure (or arrival) time by the time index interval; e.g., 1115 is rounded down to 1000 if the interval is two hours.

(b) Lookup the first departure (or arrival) corresponding to this time; e.g., 1000 corresponds to trip ordinal 1 (i.e., 1020).

(c) Consider the next departure (or arrival) if the trip does not depart on the required date; hence, the need to group departures into non-overlapping day sets.

(d) Consider the next departure (or arrival) if the trip departs before the required time; e.g., ignore the 1020 departure because it precedes 1115.

(e) If no more departures then consider departures on the next day (or arrivals on the previous day).

(f) Otherwise the next departure (or arrival) has been found; e.g., 1120 in this case.

A stopping point along a trip that is associated with a scheduled time of arrival and departure is known as a timing point. There may be other stopping points along a trip for which times have been interpolated.

Figure 4:
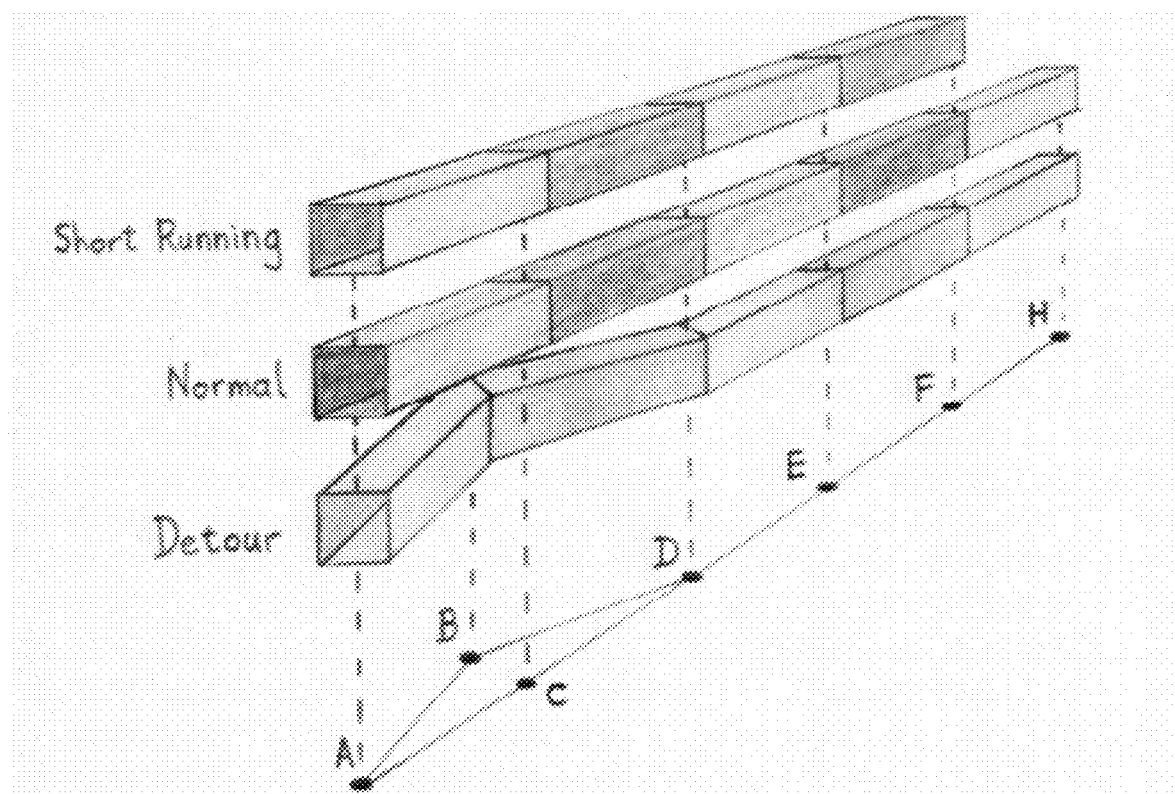
FIG. 4 illustrates the patterns traveled by the trips of FIG. 3.

FIG. 4 illustrates a useful visualization of the different patterns of bus trips along the route of FIG. 3. The patterns are stacked up above the map, i.e. above the page. The trips are grouped into patterns, segmented at each stopping point. Each pattern is a kind of conduit or passage along which trips travel.

Street Network Data

Each section of road between junctions is known as a street segment. This is a derivation and specific case of a network segment. There is a separate street segment for each direction of travel. Each segment has its own maximum walk speed (which may depend on gradient) and its own maximum vehicle speed (which may vary with time of day). These speeds may be modified using a customer-specific or enquiry-specific multiplication factor.

The street name or road number, e.g. "High Street" or "A4", is known as the network label. A sequence of consecutive street segments with the same network label defines a network passage. Note that this is analogous to a single pattern of continuous trips associated with each direction of a route.

In summary, the itinerary planning software allows the specification of the street network to be either simple or complex. The itinerary planning software is presently configured to avoid complexity by using stop-transfers, as described below.

Modeling Transfers

A transfer is a connection between an inbound vehicle and an outbound vehicle. An amount of walking may be involved. For various reasons, notably performance, transfers are pre-calculated during data preparation.

Pattern-transfers are connections between all inbound trip segments belonging to the same pattern and all outbound trip segments belonging to another pattern. A very large dataset contains hundreds of millions of pattern-transfers.

Stop-transfers are connections between all inbound trip segments at a network node (stop) and all outbound trip segments at another (or possibly the same) network node. A very large dataset contains millions of stop-transfers.

The itinerary planning software uses both pattern-transfers and stop-transfers in its implementation, and expects to encounter a mixture of these transfer types departing from a network node.

A stop-transfer is defined as implicitly excluding transfers between network segments belonging to the same route. This rule can be overridden if required by adding the appropriate pattern-transfers. Note that stop-transfers are not be used where the characteristics of the pattern-transfers differ, e.g. due to same-vehicle connections, guaranteed connections, banned or delayed turns on the street network, etc.

There is also usually a transfer comfort time associated with each transfer. This ensures that there are no dangerously-tight connections in itineraries returned. The comfort time is in addition to the walk time required to make the transfer. The comfort time is set when transfers are created and has a typical value of 5 minutes.

Unlike many other itinerary planning algorithms, the itinerary planning software works on a continuous timeline. There is a seamless join at midnight so that trips that depart just after midnight are considered in queries departing on the day before.

Seamless overnight journey planning has the side effect that there is no feature to request the earliest or latest itinerary of the day. The cut-off point between today and tomorrow is at the discretion of the client interface. For example, a user might explicitly choose to ask for the first itineraries departing after 0400 as a replacement for "earliest of the day".

Cost Functions and Parameters

Itinerary planning is usually associated with finding solutions that have the shortest duration. However, time may not be the only concern for a typical traveler. Many travelers are willing to compromise on the optimization of time provided that the solutions offer some other benefit. Common benefits include a reduced number of transfers and/or a reduced amount of walking.

These different factors can be taken into account by formulating them as part of a generalized cost function. The itinerary planner can then be used to search for solutions with the minimum cost instead of the minimum time. Of course, with an appropriate cost function, the cost can be made equivalent to time by setting the cost for all other factors to one.

The cost parameters for an itinerary planning request can represent relative cost for the different travel means and can also indicate whether certain travel means are to be included, how much walking at most is permitted, etc.

The itinerary planning software uses a cost function for a set of factors to determine which itineraries are more favorable. In this embodiment, the itinerary planning software uses a cost function for the relative costs of public transportation and walking, and for the number of transfers.

Figure 5:
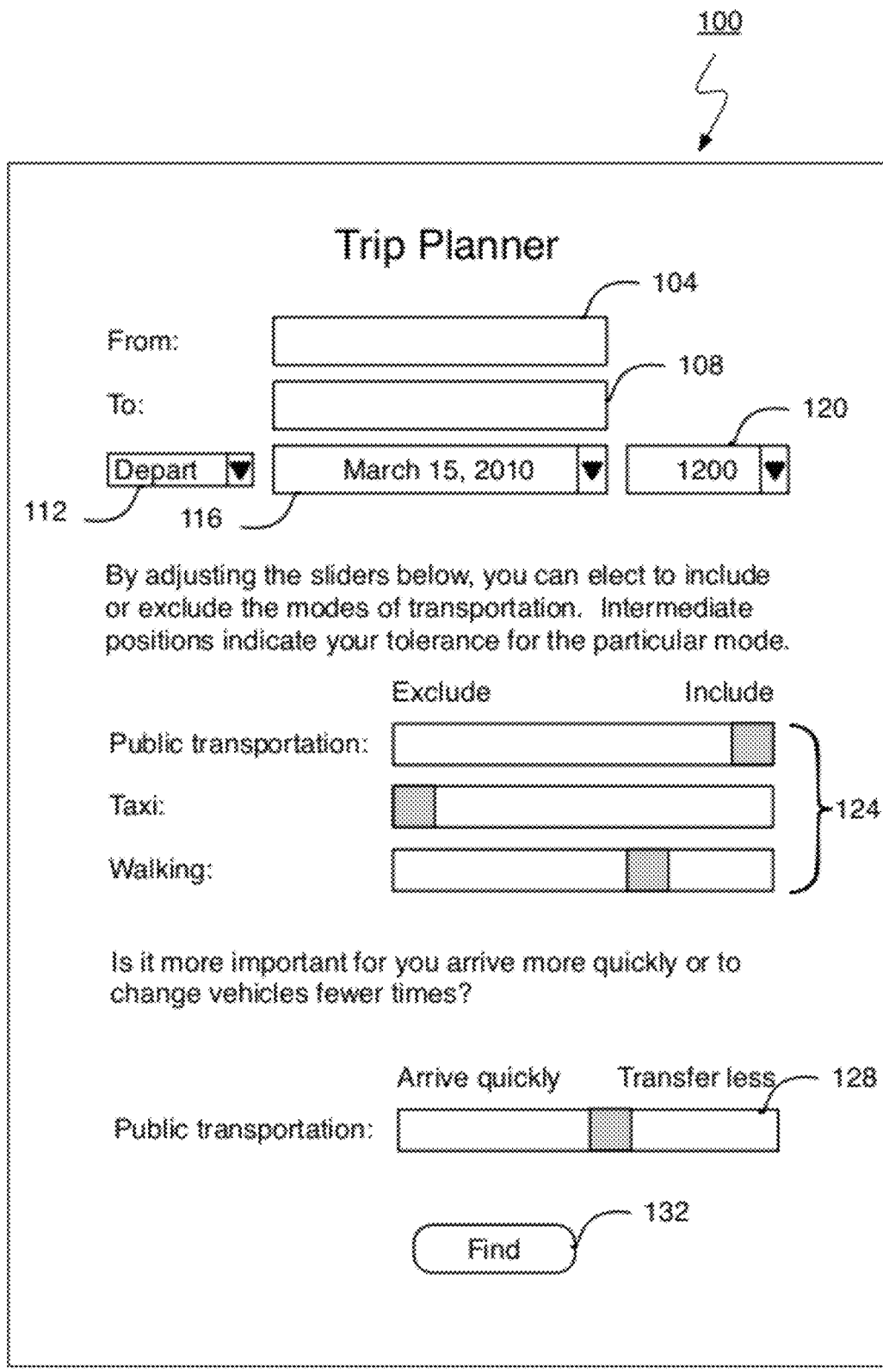
FIG. 5 shows a webpage served by the computer system of FIG. 1 for generating an itinerary planning request.

FIG. 5 shows a principal web page 100 served by the computer system 20 for enabling users of clients, such as the personal computer 28 or the mobile device 32, to submit itinerary planning requests, as well as parameters for the request. The web page 100 enables a user to request an itinerary after entering various related inputs. In particular, the web page 100 includes a from field 104 for specifying the point of departure, and a to field 108 for specifying the destination. A street address, intersection, town or city name can be entered into the from or to fields 104, 108. A drop-down box 112 enables a user to indicate whether he wishes to depart or arrive at a specific date and time. A date field 116 and a time field 120 enable entry of the date and time that the user wishes to depart or arrive.

Three sliders 124 enable the user to specify the cost parameters for each mode of travel. That is, movement of the sliders enables a user to specify his preference for each of the modes of travel. Sliding one of the sliders to the left causes that mode of transportation to be effectively excluded from the itinerary planning. Sliding one of the sliders to the right of that generates a cost for that mode of transportation and enables its inclusion in the solution. As the slider is slid more to the right, the cost of that particular mode of transportation is decreased. In the exemplary configuration shown in FIG. 5, public transportation and walking are to be included in the itinerary planning, with walking having a higher relative cost in comparison to public transportation. Note that while the position of the sliders is generally mapped to relative cost in the illustrated example, the positions can be mapped to costs and other parameters in different manners.

Another slider 128 allows the user to indicate a relative cost function for arriving quickly versus transferring vehicles fewer times. In some cases, the user may desire the quickest solution possible. In other cases, however, the user may be averse to having to transfer vehicles and could prefer to transfer fewer times even if the overall time to arrive at the destination is longer. When the slider 128 is fully to the left, the cost of transfers is set to zero, and when the slider 128 is fully to the right, the cost of transfers is set to a value such as 30 (minutes).

A find button 132 causes the web page 100 to generate an itinerary planning request that is sent to the computer system 20 with the inputs selected by the user.

The computer system 20 maps the positions of the sliders 124, 128 on the web page (included as parameters with the itinerary planning request) to relative costs, where applicable. These parameters are used by the itinerary planning software as is described below.

In this embodiment, the itinerary planning software uses a total cost function as follows:

$$C = \sum_{i=1}^{m} \frac{t_i}{r_i} + n_t \times c_t, \text{ where } 0 \leq r_i \leq 1, \text{ and}$$

where C is the total cost for a build or an itinerary, m is the number of network segments in the build or itinerary, $t_i$ is the expected time (in minutes) to traverse the $i^{th}$ network segment of the build or itinerary, $r_i$ is the parameter corresponding to the relative cost factor for the mode of travel across the $i^{th}$ network segment of the build or itinerary, $n_t$ is the number of transfers between vehicles, and $c_t$ is the cost factor for transfers. As noted above, the cost factor r ranges between 0 and 1 for each mode of travel. A value of 1 for r signifies no bias against the particular mode of travel. A value of 0 for r signifies a rejection of the particular mode of travel. Accordingly, values of r between 0 and 1 signify biases against the particular mode of travel. For example, in one scenario, bus travel can be assigned a cost factor of 1 and train travel can be assigned a cost factor of 0.7. In this case, bus travel will be favored more than train travel.

Figure 6A:
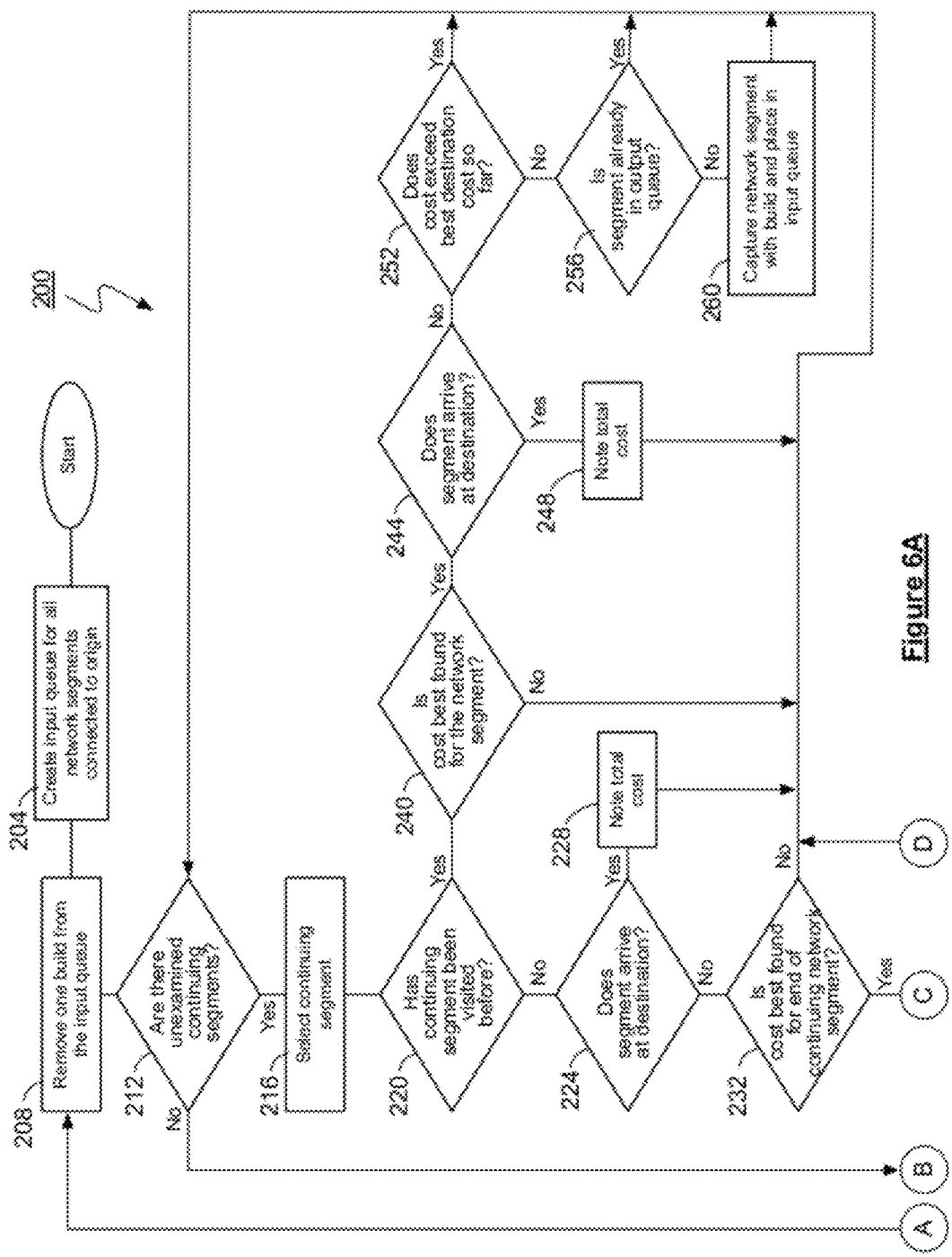
FIGS. 6A and 6B show a flowchart of the general method of itinerary planning performed by the computer system of FIG. 1.
Figure 6B:
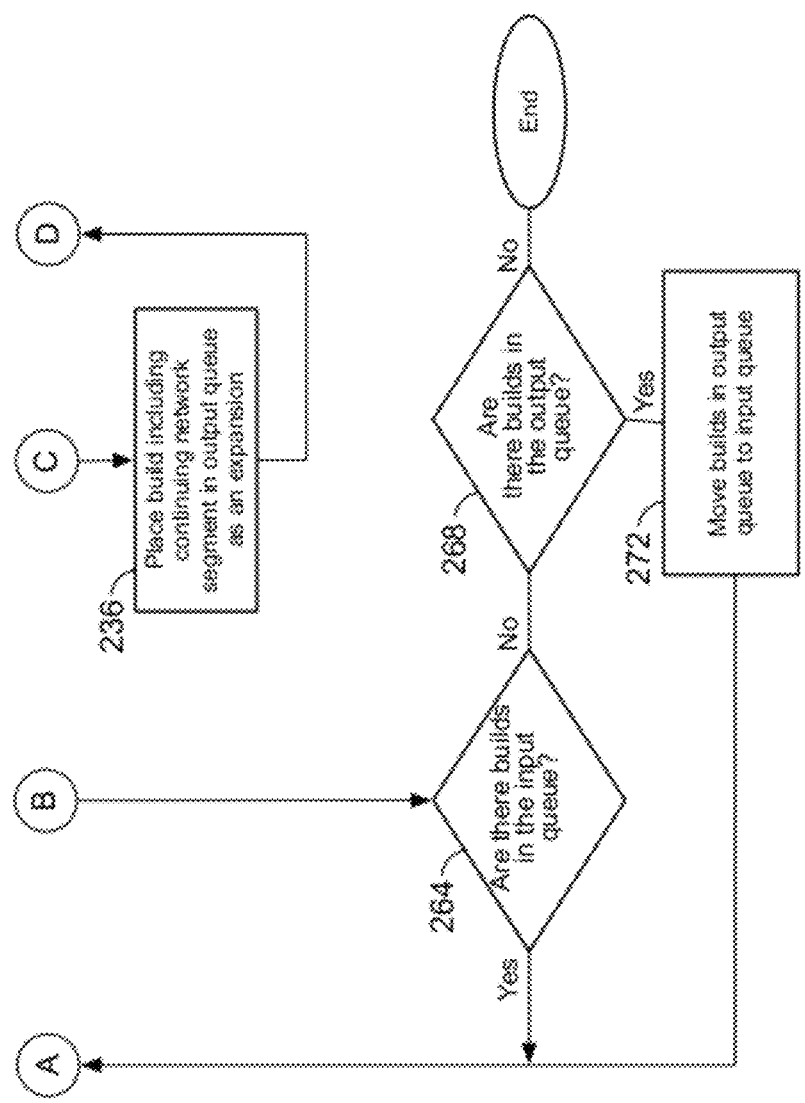

FIGS. 6A and 6B illustrate the general method 200 of itinerary planning employed by the itinerary planning software of the computer system 20.

The method commences with the creation of an input queue for all network segments connected to the origin (204). The itinerary planning software selects all network segments departing from the origin on or after the desired departure time from the travel network database 68, and places them in a first queue referred to as an input queue. The order in which the selected network segments are placed in the input queue is not important.

One of the builds is then removed for analysis from the input queue (208). As previously noted, builds are series of one or more connected network segments that form at least part of a potential solution. Immediately after 204, the builds in the input queue consist of one network segment each. As the builds are arbitrarily ordered in the input queue, the builds removed from the input queue are arbitrarily ordered. Upon removing the network segment from the input queue, the itinerary planning software determines if there are network segments in the travel network database 68 that continue from the end node of the removed build (212). The itinerary planning software searches the travel network database 68 for all network segments that continue from the end node of the build removed from the input queue and places them in a continuing network segment processing queue. As the itinerary planning software appends continuing network segments onto builds, it is aware of the timing points of preceding network segments and is able to identify the first trip of a pattern for the continuing network segments. All of this information regarding which particular trip along each network segment of a build of network segments representing at least a part of a solution is maintained by the itinerary planning software.

If there are any network segments that continue from the end node of the removed network segment, one is selected from the continuing network segment processing queue (216). The itinerary planning software then determines if the continuing network segment has been previously considered for this particular itinerary plan (220).

If the continuing network segment has not been considered before, the continuing network segment is examined to determine if it arrives at the destination (224). If it does, the total cost to arrive at the destination via the currently-analyzed build including the continuing network segment is noted (228), and the method returns to 212 to analyze other unanalyzed continuing network segments, if any. If the continuing network segment does not arrive at the destination, the itinerary planning software determines if the total cost to arrive at the end of the continuing network segment via the currently-analyzed build is, in fact, the best cost to arrive at the end of the network segment (232). If the cost to arrive at the end of the continuing network segment via the currently-analyzed build is not the best found so far for that network segment, the method returns to 212 to analyze another unanalyzed continuing network segment, if any. If, instead, the cost to arrive at the end of the continuing network segment via the currently-analyzed build is the best found thus far, the currently-analyzed build, including the build removed from the input queue and the continuing network segment, is placed as an expansion in a second queue, referred to as an output queue (236). After placement of the expansion in the output queue, the method returns to 212 to analyze another unanalyzed continuing network segment, if any.

If, instead, at 220, the itinerary planning software determines that the continuing network segment has previously been considered, the itinerary planning software determines if the total cost to arrive at the end of the continuing network segment via the currently-analyzed build is the best cost to arrive at the end of that network segment (240). If it is not, that continuing network segment is discarded as an expansion of the build removed from the input queue, after which the method thereafter returns to 212 to analyze another unanalyzed continuing network segment, if any. If, however, the cost for arriving at the end of the continuing network segment via the currently-analyzed build is the best found thus far, the itinerary planning software determines if the continuing network segment arrives at the destination (244). If it does, the itinerary planning software notes the total cost (248), and the method returns to 212 to analyze another unanalyzed continuing network segment, if any. If the continuing network segment does not arrive at the destination, the itinerary planning software determines if the total cost to arrive at the end of the particular network segment via the currently-analyzed build exceeds the best cost found thus far to arrive at the destination (252). If the cost to arrive at the end of the network segment via the currently-analyzed build exceeds the best cost found thus far to arrive at the destination, the method returns to 212 to analyze another unanalyzed continuing network segment, if any. If, however, the cost to arrive at the end of the continuing network segment via the currently-analyzed build is, in fact, lower than the best cost found thus far to arrive at the destination, the itinerary planning software determines if the continuing network segment is already in the output queue (256). If the continuing network segment is already in the output queue, the method returns to 212 to analyze another unanalyzed continuing network segment, if any. If, however, the continuing network segment is not found in the output queue, the build removed from the input queue and the continuing network segment are "captured" and re-placed in the input queue as a build (260). Thereafter, the method returns to 212 to analyze another unanalyzed continuing network segment, if any.

Once the itinerary planning software determines that there are no further unanalyzed continuing network segments at 212, the itinerary planning software determines if there are builds remaining in the input queue (264). If there are, the method returns to 208, at which the itinerary planning software removes another build from the input queue for analysis. If, however, there are no further builds in the input queue, the itinerary planning software determines if there are builds in the output queue (268). If the output queue is not empty, the builds in the output queue are moved to the input queue (272). Thereafter, the method returns to 208, with the itinerary planning software removing a build from the input queue for further analysis. If the output queue is found to be empty at 268, the method ends.

The system then outputs the itinerary to storage and prepares and serves a web page presenting the itinerary to the user.

Figure 7:
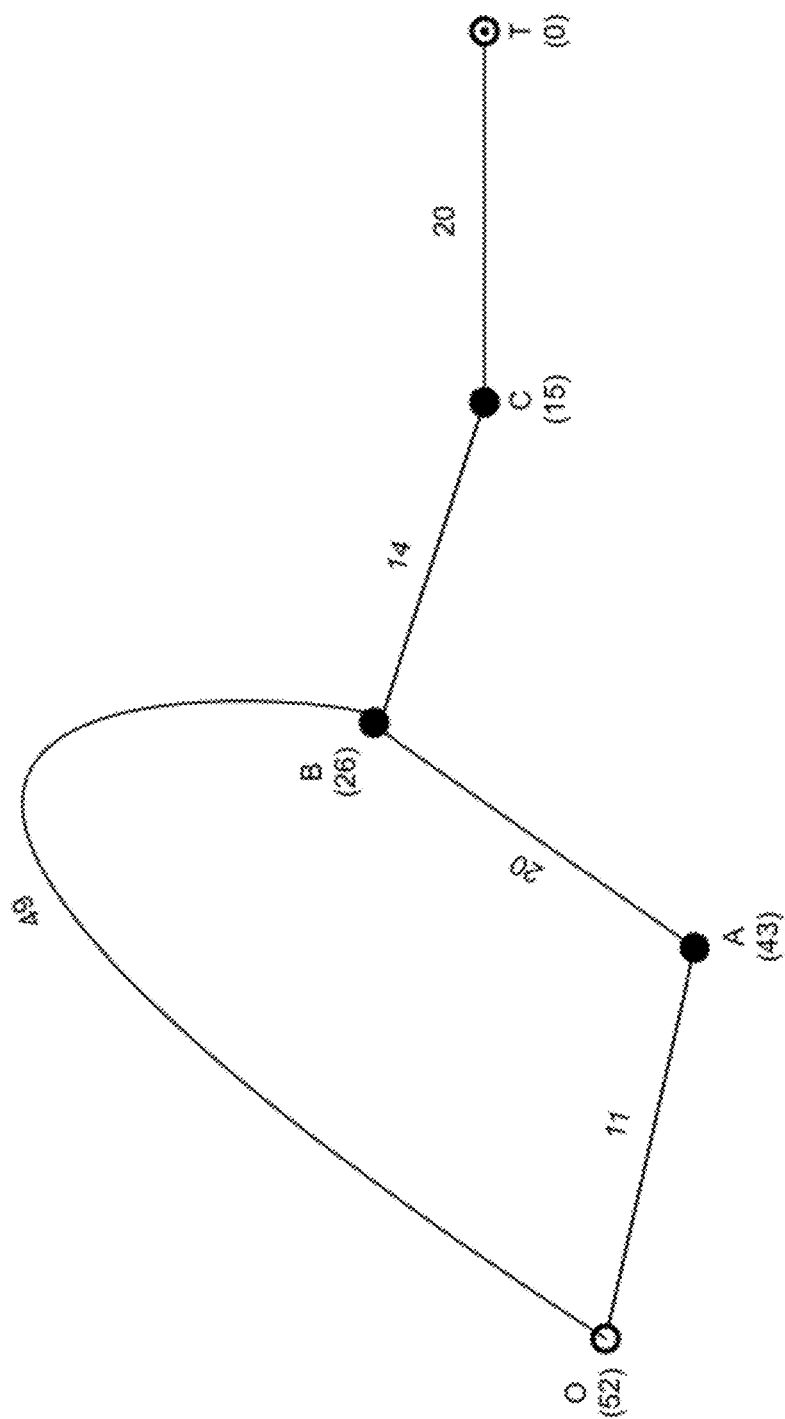
FIG. 7 is an exemplary network diagram showing a plurality of nodes connected with network segments.

FIG. 7 shows an exemplary highly-simplistic travel network. The travel network illustrates the origin and the destination specified by a user, as well as a few intermediate nodes, as well as network segments between various nodes representing potential trip segments. The expected time to traverse each network segment is presented beside each network segment, and the best possible time to arrive at the destination from each node is presented below the name of each node. Using Dijkstra's algorithm, network segment OA would be processed first, then OB. Next, the build OAB would be analyzed. As the expected time cost for arriving at B via OAB (31) is better than the expected time cost via OB (49), OB is discarded and not considered again. As a result, the ultimate solution found will be OABCT.

This solution may not be as desirable to a traveler as OBCT, however, under some circumstances. For example, perhaps a first pattern travels OAB and turns around, and a second pattern travels OBCT. If the traveler highly dislikes transferring between vehicles, the solution OBCT may be more desirable.

Figure 8:
FIG. 8 shows a results webpage with the outputted itineraries generated by the computer system of FIG. 1 for the travel network shown in FIG. 7.

FIG. 8 shows an output webpage that is generated by the computer system 20 and returned to the client in response to an itinerary planning request for travel from the origin to the destination as shown in FIG. 7. Ultimately, the parameters selected by the user result in one of the builds having the lowest cost.

Figure 9A:
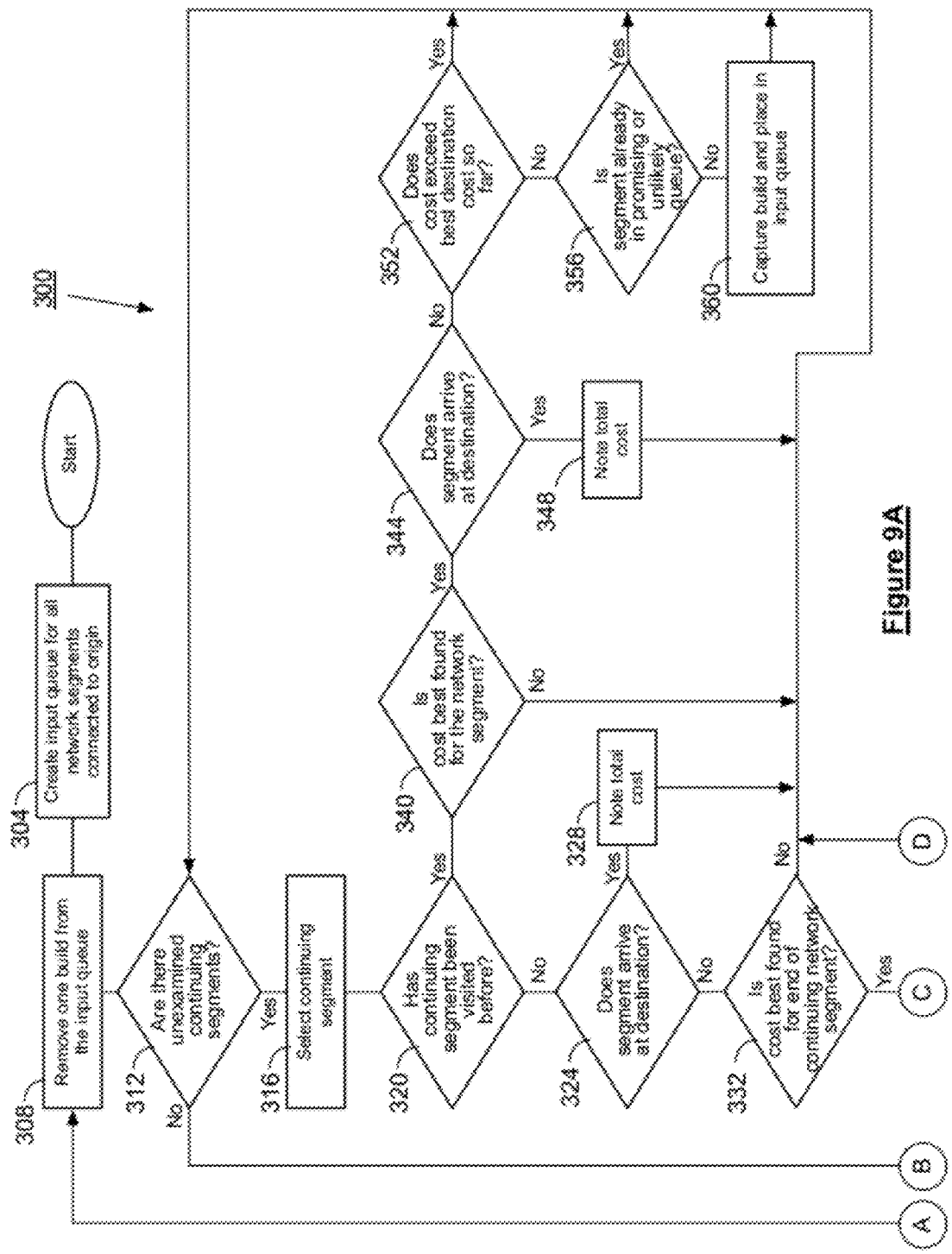
FIGS. 9A and 9B show a flowchart of a general alternative method of itinerary planning performed by the system of FIG. 1.
Figure 9B:
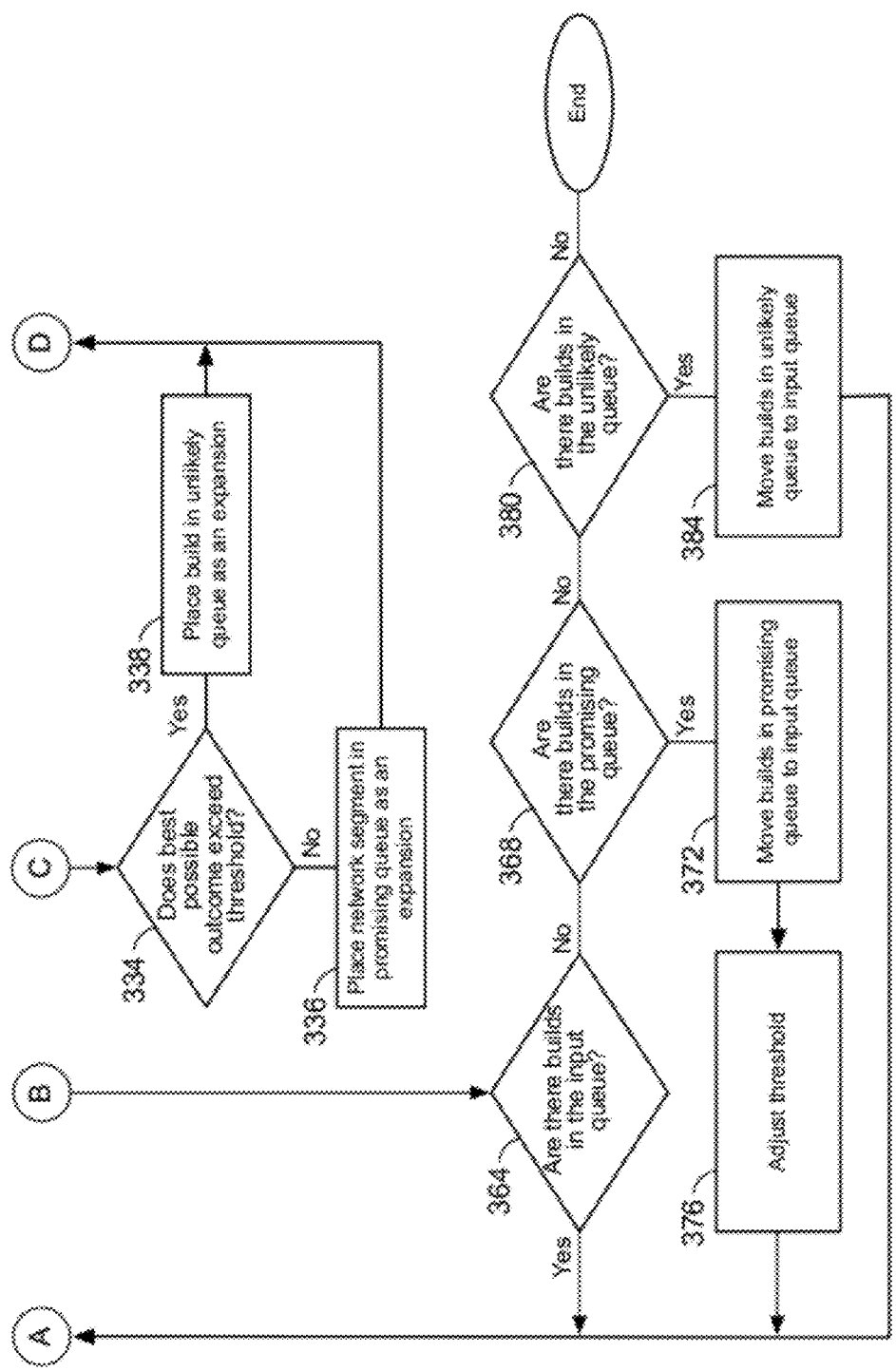

FIGS. 9A and 9B show a flow chart for another method of itinerary planning in accordance with another embodiment of the invention. In this approach, builds are quickly evaluated based on the best possible outcome using the builds. The best possible outcome is equal to the cost of traveling the build plus the best possible cost to complete the journey to the destination that is determined as a function of the spatial distance between the end of the build and the destination. Those builds that have lower best possible outcomes are placed into a promising queue, whereas those builds that have relatively higher best possible outcomes are placed into an unlikely queue. The builds in the promising queue are explored first in order to quickly find solutions along builds that are apparently better, and then the builds in the unlikely queue are explored later to determine if any provide the surprising result of being better than some of the earlier-explored builds. These results can be presented to the user as found. By categorizing builds into groups based on the best possible outcomes and processing the group(s) with the lowest best possible outcomes before the group(s) with relatively higher best possible outcomes, builds that are more promising can be quickly processed, enabling those builds that are less promising to be more quickly discounted. Further, using this approach, some or all ordered of the builds in the output queue(s) can be avoided, thus increasing the processing speed of the system.

The method commences with the creation of an input queue for all network segments connected to the origin (304). The itinerary planning software selects all network segments departing from the origin on or after the specified time from the travel network database 68, and places them in a first queue referred to as an input queue. The order in which the selected network segments are placed in the input queue is not important.

One of the builds is then removed from the input queue (308). Immediately after 304, the builds in the input queue consist of one network segment each. As the builds are arbitrarily ordered in the input queue, builds removed from the input queue are arbitrarily ordered. Upon removing the build from the input queue, the itinerary planning software determines if there are network segments in the travel network database 68 that continue from the end node of the removed build (312). The itinerary planning software searches the travel network database 68 for all network segments that continue from the end of the build removed from the input queue and places them in a continuing network segment processing queue. If there are any network segments that continue from the end of the removed build, one is selected from the continuing network segment processing queue (316). The itinerary planning software then determines if the continuing network segment has been previously considered for this particular itinerary planning (320).

If the continuing network segment has not been considered before, the continuing network segment is examined to determine if it arrives at the destination (324). If it does, the total cost to arrive at the destination via the currently-analyzed build including the continuing segment is noted (328), and the method returns to 312 to analyze other unanalyzed continuing network segments, if any. If the continuing network segment does not arrive at the destination, the itinerary planning software determines if the total cost to arrive at the end of the continuing network segment via the currently-analyzed build is, in fact, the best cost to arrive at end of that network segment (332). If the cost to arrive at the end of the continuing network segment is not the best found so far, the method returns to 312 to analyze another unanalyzed continuing network segment, if any.

If, instead, the cost to arrive at the end of the continuing network segment via the currently-analyzed build is the best found thus far, the itinerary planning software determines if the best possible outcome for the total cost of arriving at the destination via the currently-analyzed build including the continuing network segment exceeds an unlikely threshold (334). The best possible outcome to reach the destination is the total of the cost to arrive at the end of the continuing network segment being examined via the currently-analyzed build plus the best estimated cost to arrive at the destination from there. This estimated cost to arrive at the destination is generated as a function of the distance between the end of the continuing network segment and the destination. In particular, a lowest-cost-per-unit-distance constant is applied to the distance between the two nodes to estimate the best estimated cost to arrive at the destination. The lowest-cost-per-unit-distance is determined by using the travel speed of the fastest means possible, such as the travel speed for a high-speed train or an airplane.

If the best possible outcome for the currently-analyzed build is below the unlikely threshold, the build removed from the input queue and the continuing network segment are placed together as an expansion build in a second queue, referred to as a promising queue (336). If, instead, the best possible outcome is equal to or exceeds the unlikely threshold, the build removed from the input queue and the continuing network segment are placed together as an expansion build in a third queue, referred to as an unlikely queue (338). The unlikely queue is ordered by best possible outcome to reduce the processing priority of builds that are relatively-remotely possibly good solutions. After placement of the expansion build in the promising or unlikely queue, the method returns to 312 to analyze another unanalyzed continuing network segment, if any.

If, instead, at 320, the itinerary planning software determines that the continuing network segment has previously been considered, the itinerary planning software determines if the total cost to arrive at the end of the continuing network segment is the best cost to arrive at that node (340). If it is not, that continuing network segment via the currently-analyzed build is discarded as an expansion of the network segment removed from the input queue, and the method thereafter returns to 312 to analyze another unanalyzed continuing network segment, if any. If, however, the cost for arriving at the end of the continuing network segment via the currently-analyzed build is the best found thus far, the itinerary planning software determines if the continuing network segment arrives at the destination (344). If it does, the itinerary planning software notes the total cost (348), and the method returns to 312 to analyze another unanalyzed continuing network segment, if any. If the continuing network segment does not arrive at the destination, the itinerary planning software determines if the total cost to arrive at the end of the continuing network segment via the currently-analyzed build exceeds the best cost found thus far to arrive at the destination (352). If the total cost to arrive at the end of the continuing network segment via the currently-analyzed build exceeds the best cost found thus far for the destination, the method returns to 312 to analyze another unanalyzed continuing network segment, if any. If, however, the cost to arrive at the end of the continuing network segment via the currently-analyzed build is, in fact, lower than the best cost found thus far to arrive at the destination, the itinerary planning software determines if the continuing network segment is already in the promising or unlikely queue (356). If the continuing network segment is already in the output queue, the method returns to 312 to analyze another unanalyzed continuing network segment, if any. If, however, the continuing network segment is not found in the promising or unlikely queue, the build removed from the input queue and the continuing network segment are "captured" and re-placed in the input queue as a build (360). Thereafter, the method returns to 312 to analyze another unanalyzed continuing network segment, if any.

Once the itinerary planning software determines that there are no further unanalyzed continuing network segments at 312, the itinerary planning software determines if there are builds remaining in the input queue (364). If there are, the method returns to 308, at which the itinerary planning software removes another build from the input queue for analysis. If, however, there are no further builds in the input queue, the itinerary planning software determines if there are extended builds in the promising queue (368). If the promising queue is not empty, the extended builds in the promising queue are moved to the input queue (372). After movement of the extended builds from the promising queue to the input queue, the unlikely threshold is adjusted (376). In particular, a fixed value is added to the unlikely threshold. While this adjustment of the unlikely threshold which separates those compound network segments that are more likely from those that are less likely is somewhat arbitrary, the fixed value can be selected to provide a relatively good measure of how much, in general, each additional network segment should add in terms of cost.

If, instead, the itinerary planning software determines that there are no remaining builds in the promising queue at 368, the itinerary planning software determines if there are remaining builds in the unlikely queue (380). If there are, the builds in the unlikely queue are moved to the input queue (384). If builds were moved from the promising or unlikely queues to the input queue, the method returns to 308, with the itinerary planning software removing a build from the input queue for further analysis. If both the promising and unlikely queues are found to be empty at 364 and 368 respectively, the method ends.

In the scenario where a person specifies a desired arrival time, the itinerary planning software uses the same general method as described above, except that the route would be planned in reverse.

Using the above-noted approaches can be shown to be faster than using Dijkstra's Algorithm provided that there is relatively little capture taking place. This is often true on a street network as the topology is fairly uniform; that is, the lowest cost solution between any two points usually involves traversing the fewest network segments.

Further, the use of promising and unlikely queues enables the use of heuristics such as the spatial displacement from the destination to process more promising routes earlier than less promising routes.

Various Cost Considerations

For a depart-hereafter query, the timeliest itinerary is the earliest to arrive at the destination having departed at or after the specified departure time.

For an arrive-by query, the timeliest itinerary is the latest to depart from the origin and reach the destination at or before the specified arrival time.

For a depart-hereafter query, the quickest itinerary is the itinerary with the shortest duration departing at or after the specified departure time and before the specified latest departure time. This range of times is known as the leeway.

For an arrive-by query, the quickest itinerary is the itinerary with the shortest duration arriving at or before the specified arrival time and after the specified earliest arrival time.

Both the timeliest and quickest itineraries can be of interest to a traveler, depending on their circumstances. This depends on whether the enquirer is traveling now, planning to travel at a specific time, or planning to travel at a non-specific time. The quickest itinerary has the most appeal in the latter of these cases.

Timeliest and quickest itineraries have vastly different characteristics, particularly when considering the next best itinerary after the optimum solution. Quickest itineraries are highly sensitive to the leeway whereas timeliest itineraries are less so. However, note that in practice a range of times must be specified for timeliest queries also, so that the algorithm knows how far ahead to search. Both timeliest and quickest queries may fail to find any itineraries at all if the leeway is too small.

Timeliest and quickest queries can both be adapted to handle generalized cost rather than time. The only effective difference between the two is that timeliest queries add a cost for the initial wait at the origin (for depart-hereafter) whereas quickest queries ignore this cost.

A simple approach utilized by the itinerary planning software to generate reasonable alternative itineraries is to execute multiple queries with differing parameters in an order that lends itself to asynchronous operation. The results can then be merged (to remove duplicate solutions) and presented to the enquirer in the desired order.

When considering a network segment during expansion information about the path to that network segment is recorded. This information is held in a build. The result of an expansion is an itinerary formed from a linked list of builds.

There are a number of scenarios in which multiple builds may need to be created when considering a network segment. These occur whenever the generalized cost to reach the network segment along a particular path is not optimal, but may become so further ahead in the search. Consider the following examples:

When alighting a vehicle and walking to the destination a cheaper path may be encountered that involves a longer walk. However, the request usually constrains each walk leg to a maximum distance, so the cheaper path may not ultimately reach the destination. It is therefore desirable to maintain alternative builds between meeting the cheaper path and reaching the destination.

As above, a longer but cheaper walk is encountered whilst walking to the destination. However, the request may bias against long walk legs by doubling the cost of walking beyond the first 800 m of the leg. It is therefore possible for the path with the shorter but more expensive walk to become the cheapest solution by the time the destination has been reached.

Suppose that a journey involves travel on a bus followed by a train. It is quite possible that the earliest arrival at the first rail station is achieved using two buses. However, there may also be a single bus that travels to this rail station. This bus arrives later than the two bus journey but still in time to connect with the same train. In many cases, particularly when there is a cost bias against changing vehicle, the single bus solution will ultimately prove to be the cheapest. It is therefore necessary to generate alternative builds in this scenario.

The unlikely threshold can be adjusted in a number of manners. In another embodiment, the unlikely threshold can be adjusted by multiplying it by a factor. In a further embodiment, the unlikely threshold can be adjusted dynamically as a function of the best possible outcomes of the processed network segments. In this manner, adjustment of the unlikely threshold can be adapted to consider changes in best possible outcomes and other metrics for network segments processed.

Computer-executable instructions for implementing the itinerary planning software on a computer system could be provided separately from the computer system, for example, on a computer-readable medium (such as, for example, an optical disk, a hard disk, a USB drive or a media card) or by making them available for downloading over a communications network, such as the Internet.

While the computer system is shown as a single physical computer, it will be appreciated that the computer system can include two or more physical computers in communication with each other. Accordingly, while the embodiment shows the various components of the itinerary planning software residing on the same physical computer, those skilled in the art will appreciate that the components can reside on separate physical computers.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A method for itinerary planning, comprising:
    populating by a computer processor a first queue stored on a non-transitory computer readable medium with a first set of network segments connected to an origin;
    removing by the computer processor one of said network segments from said first queue;
    placing by the computer processor an expansion build representing said one network segment together with a continuing network segment in a second queue stored on a non-transitory computer readable medium if said continuing network segment has not been considered and a noted cost for arriving at the end of the continuing network segment, via expansion build, is the best found thus far, noting by the computer processor a total cost of arriving at a destination for the expansion build if the expansion build arrives at the destination;
    placing by the computer processor a captured build representing said one network segment together with said continuing network segment in said first queue if said continuing network segment has been considered and a noted cost for arriving at the end of the continuing network segment, via the captured build, is the best found thus far;
    repeating said placing until said first queue is empty;
    replacing by the computer processor said first queue with said expansion builds in said second queue;
    repeating said removing to said replacing steps until said first and second queues are empty; and
    outputting by the computer processor at least one of said builds having a lowest cost
    wherein said lowest cost is determined by the computer processor based on a total cost (C) function:

$$C = \sum_{i=1}^{m} \frac{t_i}{r_i} + n_i \times c_t, \text{ where } 0 \le r_i \le 1,$$

where m is the number of network segments in the build, $t_i$ is the expected time to traverse the $i^{th}$ network segment of the build, $r_i$ is the parameter corresponding to a relative cost factor for a selected mode of travel across the $i^{th}$ network segment, $n_i$ is the total number of transfers between vehicles, and $c_t$ is the cost factor for transfers.

2. The method of claim 1, wherein said placing said expansion build comprises:
    placing said expansion build in said second queue if a best possible outcome for said expansion build is less than or equal to a threshold value; and
    placing said expansion build in a third queue if said best possible outcome for said expansion build is greater than said threshold value,
    and wherein said repeating said removing comprises:
    repeating said removing to said replacing steps until said first, second and third queues are empty.

3. The method of claim 2, further comprising:
    replacing said first queue with said third queue when said first and second queues are empty.

4. The method of claim 3, wherein replacing said first queue further comprises:
    adjusting said threshold value.

5. The method of claim 1, wherein said placing said expansion build comprises:
    placing said expansion build representing said one network segment together with a continuing network segment in a second queue if said continuing network segment has not been considered and if the cost to arrive at the end of said expansion build is better than the cost previously determined for arriving at the end of said continuing network segment.

6. The method of claim 1, wherein said placing said captured build comprises:
    placing a captured build representing said one network segment together with said continuing network segment in said first queue if said continuing network segment has been considered and if the cost to arrive at the end of said captured build is better than the cost previously determined for arriving at the end of said continuing network segment.

7. The method of claim 1, further comprising:
    noting the cost of said build if said continuing network segment arrives at the destination.

8. An itinerary planning system for itinerary planning, comprising:
    a database of network segments stored on a non-transitory computer readable medium;
    a processor executing computer-executable instructions stored on the computer readable medium, the computer-executable instructions comprising: analyzing said network segments and, receiving an itinerary planning request, populating a first queue with a first set of network segments connected to an origin, removing one of said network segments from said first queue, placing an expansion build representing said one network segment together with a continuing network segment in a second queue if said continuing network segment has not been considered and a noted cost for arriving at the end of the continuing network segment, via expansion build, is the best found thus far, and noting a total cost of arriving at a destination for the expansion build if the expansion build arrives at the destination, placing a captured build representing said one network segment together with said continuing network segment in said first queue if said continuing network segment has been considered and a noted cost for arriving at the end of the continuing network segment, via the captured build, is the best found thus far, repeating said placing until said first queue is empty, replacing said first queue with said expansion builds in said second queue, and repeating said removing to said replacing steps until said first and second queues are empty, and outputting at least one of said builds having a lowest cost;

wherein said lowest cost is determined by the computer processor based on a total cost (C) function:

$$C = \sum_{i=1}^{m} \frac{t_i}{r_i} + n_i \times c_t, \text{ where } 0 \le r_i \le 1,$$

where m is the number of network segments in the build, $t_i$ is the expected time to traverse the $i^{th}$ network segment of the build, $r_i$ is the parameter corresponding to a relative cost factor for a selected mode of travel across the $i^{th}$ network segment, $n_i$ is the total number of transfers between vehicles, and $c_t$ is the cost factor for transfers.

9. The system of claim 8, wherein said processor places said expansion build in said second queue if a best possible outcome for said expansion build is less than or equal to a threshold value, places said expansion build in a third queue if said best possible outcome for said expansion build is greater than said threshold value, and repeats said removing to said replacing steps until said first, second and third queues are empty.

10. The system of claim 9, wherein said processor replaces said first queue with said third queue when said first and second queues are empty.

11. The system of claim 10, wherein said processor adjusts said threshold value when replacing said first queue with said second queue.

12. The system of claim 8, wherein said processor places said expansion build representing said one network segment together with a continuing network segment in a second queue if said continuing network segment has not been considered and if the cost to arrive at the end of said expansion build is better than the cost previously determined for arriving at the end of said continuing network segment.

13. The system of claim 8, wherein said processor places a captured build representing said one network segment together with said continuing network segment in said first queue if said continuing network segment has been considered and if the cost to arrive at the end of said captured build is better than the cost previously determined for arriving at the end of said continuing network segment.

14. The system of claim 8, wherein said processor notes the cost of said network build if said continuing network segment arrives at the destination.

15. A method for itinerary planning, comprising:
generating by a computer processor builds of network segments for a journey, said network segments being stored in a database on a non-transitory computer readable medium accessible by a computer system;
placing by the computer processor said builds that whose last network segment has been previously considered in a first queue if a noted cost for arriving at an end of a last network segment in the builds is the best found thus far;
placing said builds whose last network has been previously unconsidered in a second queue stored on a non-transitory computer readable medium if a noted cost for arriving at an end of a last network segment in the builds is the best found thus far, noting a total cost of arriving at the destination for said builds if said builds arrive at the destination;
expanding said builds in said first queue before expanding said builds in said second queue; and
outputting by the computer processor at least one of said builds arriving at a destination for said journey having a lowest cost;
wherein said lowest cost is determined by the computer processor based on a total cost (C) function:

$$C = \sum_{i=1}^{m} \frac{t_i}{r_i} + n_i \times c_t, \text{ where } 0 \le r_i \le 1,$$

where m is the number of network segments in the build, $t_i$ is the expected time to traverse the $i^{th}$ network segment of the build, $r_i$ is the parameter corresponding to a relative cost factor for a selected mode of travel across the $i^{th}$ network segment, $n_i$ is the total number of transfers between vehicles, and $c_t$ is the cost factor for transfers.

16. The method of claim 15, wherein said placing said builds in said second queue comprises:
placing said builds in said second queue if a best possible outcome for said builds is less than or equal to a threshold value; and
placing said builds in a third queue if said best possible outcome for said builds is greater than said threshold value.

17. The method of claim 16, further comprising: replacing said first queue with said second queue when said first queue is empty.

18. The method of claim 17, further comprising: replacing said first queue with said third queue when said first and second queues are empty.

19. The method of claim 18, wherein replacing said first queue further comprises:
adjusting said threshold.

* * * * *